United States Patent
Chae et al.

(10) Patent No.: US 12,322,872 B2
(45) Date of Patent: Jun. 3, 2025

(54) FEEDING NETWORK DEVICE FOR IMPROVED DIRECTION ESTIMATION

(71) Applicant: Korea Electronics Technology Institute, Seongnam-si (KR)

(72) Inventors: Soo Chang Chae, Seongnam-si (KR); Ki Jin Kim, Hwaseong-si (KR); Kwang Ho Ahn, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 346 days.

(21) Appl. No.: 18/073,720

(22) Filed: Dec. 2, 2022

(65) Prior Publication Data
US 2023/0187825 A1    Jun. 15, 2023

(30) Foreign Application Priority Data
Dec. 13, 2021    (KR) .................. 10-2021-0177549

(51) Int. Cl.
*H01Q 3/36* (2006.01)
*G01S 13/44* (2006.01)

(52) U.S. Cl.
CPC ........... *H01Q 3/36* (2013.01); *G01S 13/4463* (2013.01)

(58) Field of Classification Search
CPC ............ G01S 13/4409; G01S 13/4445; G01S 13/4463; G01S 7/032; G01S 7/034; H01Q 21/0075; H01Q 21/08; H01Q 25/02; H01Q 3/36
See application file for complete search history.

(56) References Cited

U.S. PATENT DOCUMENTS 9,219,317 B1 * 12/2015 Strassner, II ......... H01Q 3/2605
2022/0200147 A1 * 6/2022 Horn ...................... H04B 7/088
2023/0361447 A1 * 11/2023 Tamaru .................... H01P 1/18

* cited by examiner

*Primary Examiner* — Timothy X Pham
(74) *Attorney, Agent, or Firm* — NSIP Law (57) ABSTRACT

There is provided a feeding network device for improved direction estimation. The feeding network device according to an embodiment of the disclosure includes a first coupler, a second coupler, a first delay, a second delay, a crossover, a third coupler, a fourth coupler, a third delay, and a fourth delay. Accordingly, one sum beam and a plurality of difference beams are emitted through the feeding network device of the array antenna, and improved direction estimation is possible through a plurality of monopulse ratios, and accordingly, improvement of direction estimation in a monopulse radar device is expected.

8 Claims, 10 Drawing Sheets

FIG. 1

(Related Art)

Quadrature hybrid coupler

FIG. 5

90° phase delay

|  | Output 1 | Output 2 | Output 3 | Output 4 |
|---|---|---|---|---|
| Input 1 | 1∠180° | 1∠180° | 1∠0° | 1∠0° |
| Input 2 | 1∠90° | 1∠90° | 1∠90° | 1∠90° |
| Input 3 | 1∠90° | 1∠-90° | 1∠-90° | 1∠90° |
| Input 4 | 1∠0° | 1∠180° | 1∠0° | 1∠180° |

FEEDING NETWORK DEVICE FOR IMPROVED DIRECTION ESTIMATION

CROSS-REFERENCE TO RELATED APPLICATION(S) AND CLAIM OF PRIORITY

This application is based on and claims priority under 35 U.S.C. § 119 to Korean Patent Application No. 10-2021-0177549, filed on Dec. 13, 2021, in the Korean Intellectual Property Office, the disclosure of which is herein incorporated by reference in its entirety.

BACKGROUND

Field

The disclosure relates to a feeding network device, and more particularly, to a feeding network device of an array antenna which is applicable to a monopulse radar device and is capable of improving performance of direction estimation technology.

Description of Related Art

Figure 1:
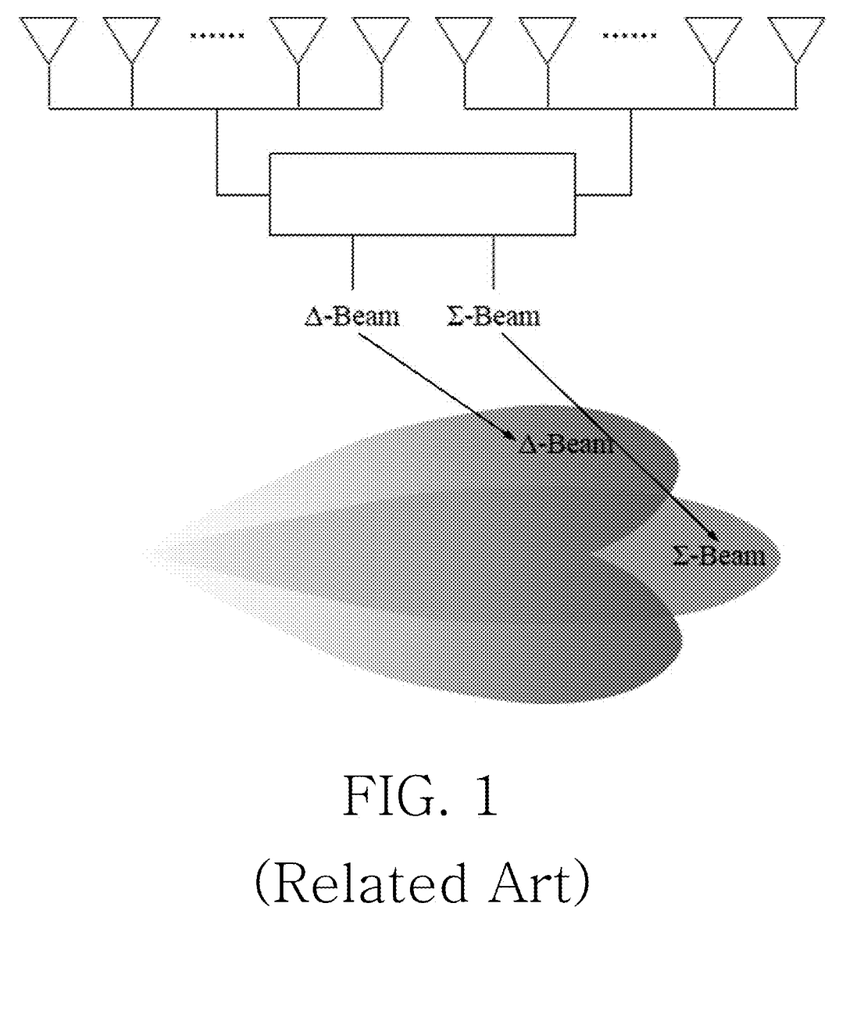
FIG. 1 is a view illustrating a general direction estimation system utilizing monopulse radar technology.

In general, direction finding is utilized as radar technology which detects and traces a target in the defence field. As shown in FIG. 1, a radar system performs direction finding by monopulse radar technology which utilizes a sum beam (s-Beam) formed on a center of an antenna, and a difference beam (Δ-Beam) branching into the left and right sides. Since the monopulse radar technology is easy to implement hardware wise, and has an advantage of directly extracting an analogue signal, it is widely used in direction estimation systems.

Figure 2:
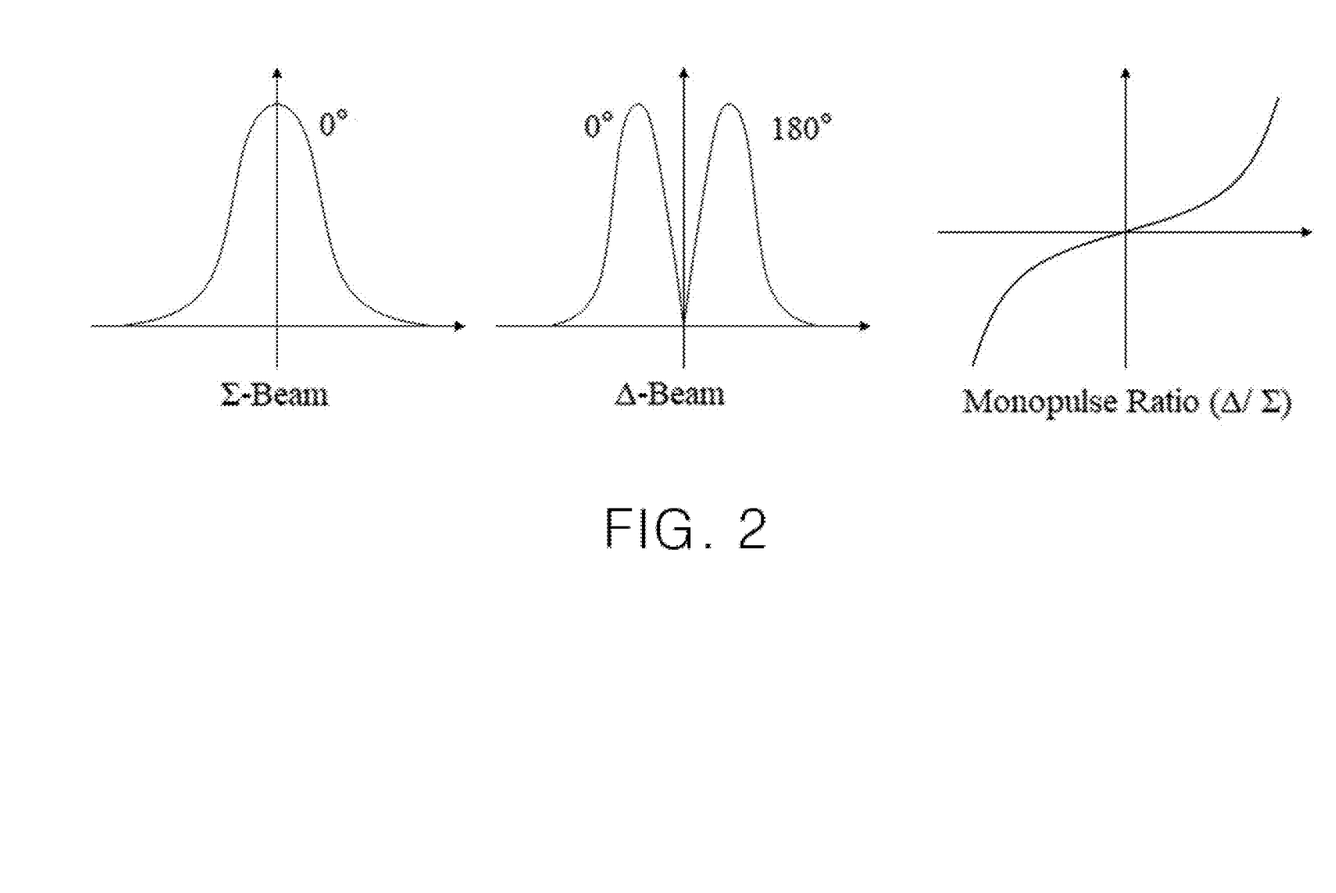
FIG. 2 is a diagram illustrating calculation of a monopulse ratio in a monopulse radar.

The monopulse radar technology finds a direction based on a monopulse ratio (=Δ/Σ) by calculating a ratio between a sum beam and a difference beam, as shown in FIG. 2. A slop of the monopulse ratio in the monopulse radar may influence performance of direction estimation.

With the recent development of communication technology, an Internet of Things (Iot) environment is increasingly established, and the demand for a sensor network system, in which a plurality of sensors are connected to the Internet and communicate with one another, is increasing, and there is increasing interest in technology for estimating a position and a direction of each sensor.

The monopulse radar technology may be implemented by a simple hardware structure, and has the advantage of easily being applied to small-sized sensor systems. However, in order to implement the mono radar technology in a small-sized device, the number of antennas of the device may be reduced. To this end, as shown in FIGS. 3A and 3B, an antenna beam width may increase and a slope of a monopulse ratio may be reduced, which results in degradation of accuracy.

Figure 3A:
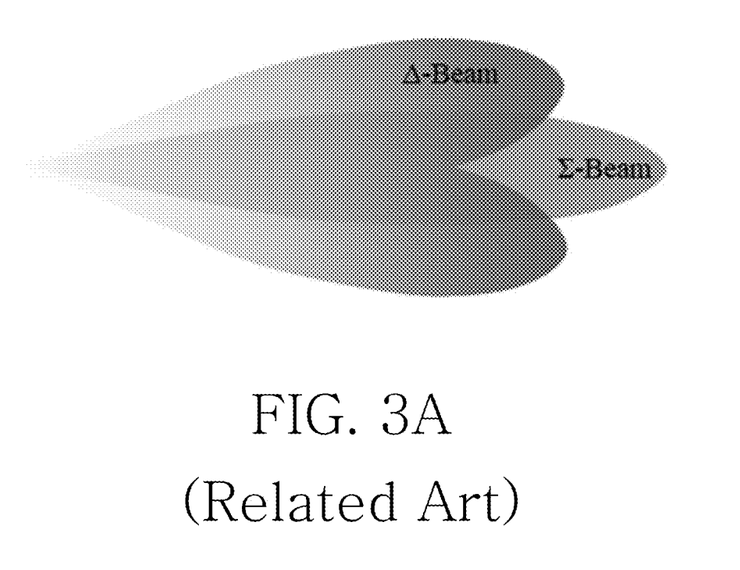
FIGS. 3A and 3B are views illustrating comparison of a sum beam and a difference beam according to a change in an antenna beam width.
Figure 3B:
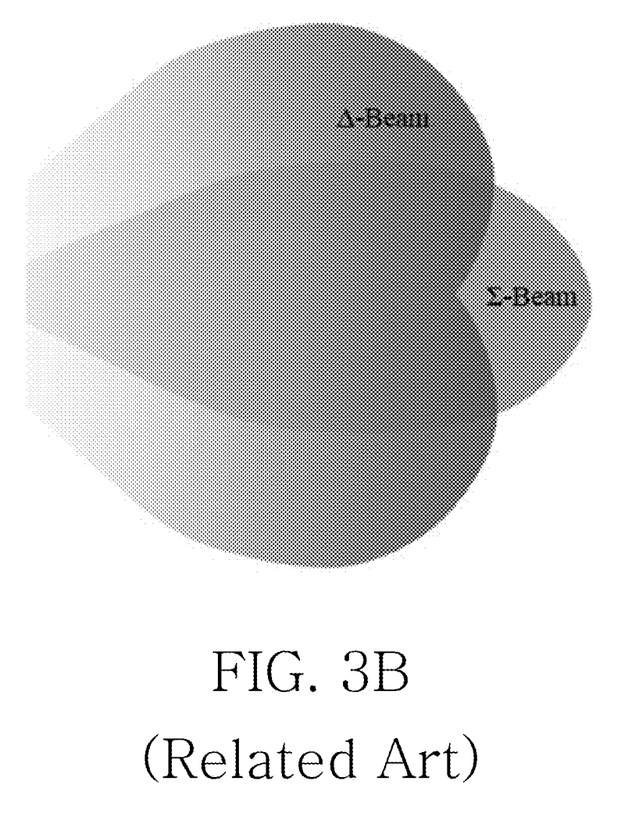

FIG. 3A illustrates a sum beam and a difference beam when a large number of antenna arrays are used, and FIG. 3B illustrates a sum beam and a difference beam when a small number of antenna arrays are used.

SUMMARY

The disclosure has been developed to address the above-discussed deficiencies of the prior art, and an object of the present disclosure is to provide a feeding network device of an array antenna which is applicable to a monopulse radar device and is capable of improving direction estimation performance.

According to an embodiment of the disclosure to achieve the above-described object, a feeding network device includes: a first coupler configured to convert a first input signal inputted through a first input port into two output signals having a 90-degree phase difference and to output the signals, and to convert a second input signal inputted through a second input port into two output signals having a 90-degree phase difference and to output the signals; a second coupler configured to convert a third input signal inputted through a third input port into two output signals having a 90-degree phase difference and to output the signals, and to convert a fourth input signal inputted through a fourth input port into two output signals having a 90-degree phase difference and to output the signals; a first delay configured to delay a second output signal of the first coupler; a second delay configured to delay a second output signal of the second coupler; a third coupler configured to convert a first output signal of the first coupler into two output signals having a 90-degree phase difference and to output the signals, and to convert a first output signal of the second coupler into two output signals having a 90-degree phase difference; a fourth coupler configured to convert an output signal of the first delay into two output signals having a 90-degree phase difference and to output the signals, and to convert an output signal of the second delay into two output signals having a 90-degree phase difference and to output the signals; a third delay configured to delay a first output signal of the third coupler; a first output port configured to output an output signal of the third delay; a second output port configured to output a second output signal of the third coupler; a fourth delay configured to delay a first output signal of the fourth coupler; a third output port configured to output an output signal of the fourth delay; and a fourth output port configured to output a second output signal of the fourth coupler.

According to an embodiment of the disclosure, the feeding network device may further include a crossover configured to cross the output signal of the first delay and the first output signal of the second coupler, and to deliver the signals to the fourth coupler and the third coupler, respectively.

The first input signal, the second input signal, the third input signal, and the fourth input signal may be inputted to the first input port, the second input port, the third input port, and the fourth input port, respectively, in sequence at time intervals.

Antennas may be connected to the first output port, the second output port, the third output port, and the fourth output port, respectively.

When the second input signal is inputted through the second input port, a sum beam pattern may be emitted from the antennas.

When the first input signal is inputted through the first input port, the second input signal is inputted through the second input port, or the third input signal is inputted through the third input port, a difference beam may be emitted from the antennas.

A difference beam pattern emitted through the antennas when the first input signal is inputted through the first input port, and a difference beam pattern emitted through the antennas when the third input signal is inputted through the third input port may have a latest phase on a center and both ends, and a difference beam pattern emitted through the antennas when the fourth input signal is inputted through the fourth input port may have an earliest phase on both ends and has a latest phase on a center and between the center and both ends.

According to another embodiment of the disclosure, a radar device includes: a first coupler configured to convert a first input signal inputted through a first input port into two output signals having a 90-degree phase difference and to output the signals, and to convert a second input signal inputted through a second input port into two output signals having a 90-degree phase difference and to output the signals; a second coupler configured to convert a third input signal inputted through a third input port into two output signals having a 90-degree phase difference and to output the signals, and to convert a fourth input signal inputted through a fourth input port into two output signals having a 90-degree phase difference and to output the signals; a first delay configured to delay a second output signal of the first coupler; a second delay configured to delay a second output signal of the second coupler; a third coupler configured to convert a first output signal of the first coupler into two output signals having a 90-degree phase difference and to output the signals, and to convert a first output signal of the second coupler into two output signals having a 90-degree phase difference; a fourth coupler configured to convert an output signal of the first delay into two output signals having a 90-degree phase difference and to output the signals, and to convert an output signal of the second delay into two output signals having a 90-degree phase difference and to output the signals; a third delay configured to delay a first output signal of the third coupler; a first output port configured to output an output signal of the third delay; a second output port configured to output a second output signal of the third coupler; a fourth delay configured to delay a first output signal of the fourth coupler; a third output port configured to output an output signal of the fourth delay; a fourth output port configured to output a second output signal of the fourth coupler; and an array antenna which includes antennas connected to the first output port, the second output port, the third output port, and the fourth output port, respectively.

According to embodiments of the disclosure described above, one sum beam and a plurality of difference beams are emitted through the feeding network device of the array antenna, and improved direction estimation is possible through a plurality of monopulse ratios, and accordingly, improvement of direction estimation in a monopulse radar device is expected.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in detail with reference to the accompanying drawings.

An embodiment of the disclosure proposes a feeding network device of an array antenna which emits one sum beam and a plurality of difference beams, as a solution to improve direction estimation performance in a monopulse radar device.

Figure 4:
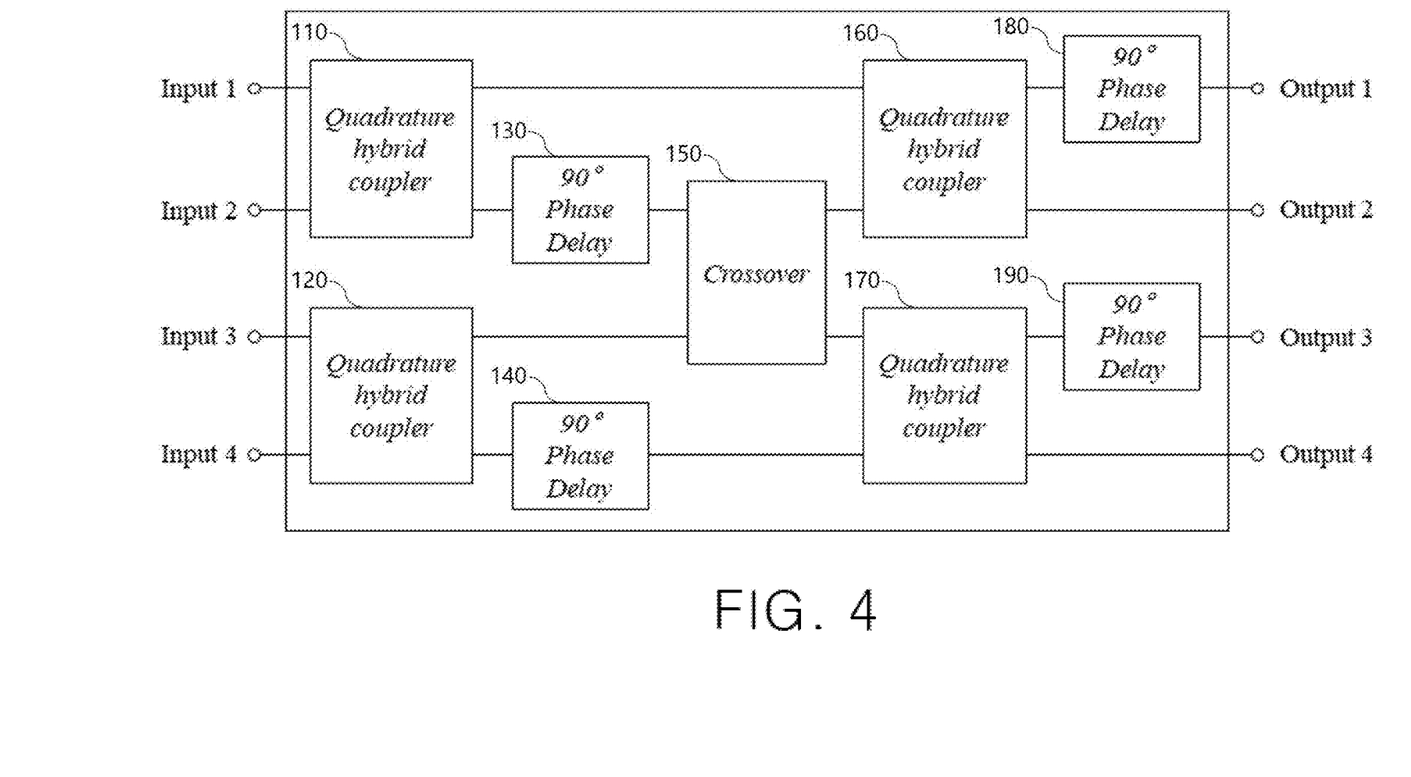
FIG. 4 is a view illustrating a structure of a feeding network device of an array antenna according to an embodiment of the disclosure.

FIG. 4 is a view illustrating a structure of a feeding network device of an array antenna according to an embodiment of the disclosure.

The feeding network device of the array antenna according to an embodiment may have four input ports Input 1, 2, 3, 4 and four output ports Output 1, 2, 3, 4, and may include a first coupler 110, a second coupler 120, a first delay 130, a second delay 140, a crossover 150, a third coupler 160, a fourth coupler 170, a third delay 180, a fourth delay 190.

The first coupler 110 may convert a first input signal inputted through the first input port Input 1 into two output signals having a 90-degree phase difference and may output the signals, and may convert a second input signal inputted through the second input port Input 2 into two output signals having a 90-degree phase difference and may output the signals.

The second coupler 120 may convert a third input signal inputted through the third input port Input 3 into two output signals having a 90-degree phase difference and may output the signals, and may convert a fourth input signal inputted through the fourth input port Input 4 into two output signals having a 90-degree phase difference and may output the signals.

Figure 5:
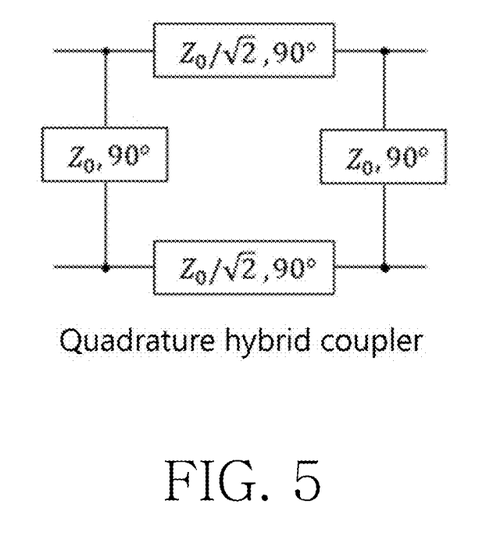
FIG. 5 is a view illustrating a structure of a quadrature hybrid coupler.

The first coupler 110 and the second coupler 120 may be implemented by a quadrature hybrid coupler having a structure shown in FIG. 5.

A first output signal of the first coupler 110 may be delivered to the third coupler 160, and a second output signal may be delivered to the first delay 120. The first delay 130 may delay the second output signal of the first coupler 110 by 90 degrees, and may output the signal to the crossover 150.

A first output signal of the second coupler 120 may be delivered to the crossover 150, and a second output signal of the second coupler 120 may be delivered to the second delay 140. The second delay 140 may delay the second output signal of the second coupler 120 by 90 degrees, and may output the signal to the crossover 150.

Figure 6:
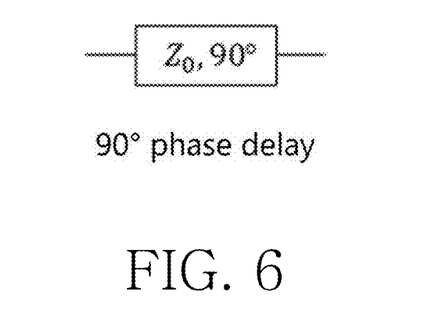
FIG. 6 is a view illustrating a 90-degree phase delay.

The first delay 130 and the second delay 140 may be implemented by a 90° phase delay of a structure shown in FIG. 6.

Figure 7:
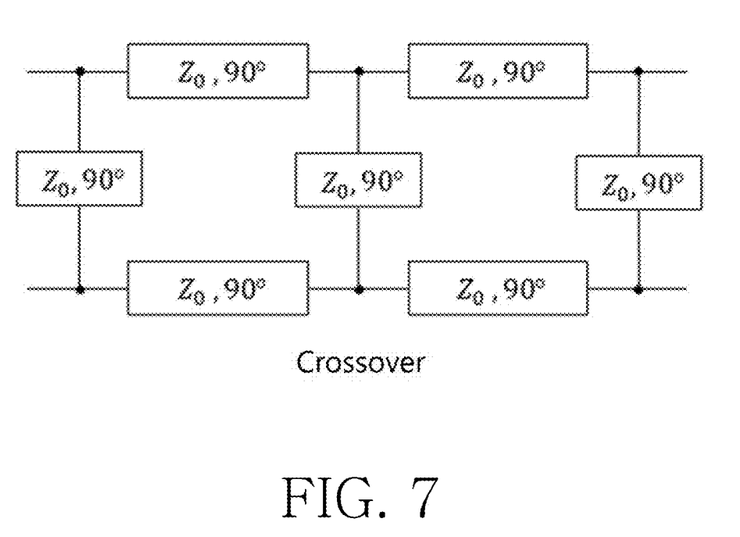
FIG. 7 is a view illustrating a structure of a crossover.

The crossover 150 may cross the output signal of the first delay 130 and the first output signal of the second coupler 120, and may deliver the signals to the fourth coupler 170 and the third coupler 160, respectively. As shown in FIG. 7, the crossover 150 may be implemented by connecting two quadrature hybrid couplers, and may be arranged so as not to allow lines to directly intersect with each other vertically when advancing directions of the lines should intersect with each other.

The third coupler 160 may convert the first output signal of the first coupler 110 into two output signals having a 90-degree phase difference and may output the signals, and may convert a first output signal of the crossover 150 (that is, the first output signal of the second coupler 120) into two output signals having a 90-degree phase difference and may output the signals.

The fourth coupler 170 may convert a second output signal of the crossover 150 (that is, the output signal of the first delay 130) into two output signals having a 90-degree phase difference and may output the signals, and may convert the output signal of the second delay 140 into two output signals having a 90-degree phase difference and may output the signals.

The third coupler 160 and the fourth coupler 170 may be implemented by the quadrature hybrid coupler of the structure shown in FIG. 5.

A first output signal of the third coupler 110 may be delivered to the third delay 180, and a second output signal of the third coupler 110 may be outputted to an antenna through the second output port Output 2. The third delay 180 may delay the first output signal of the third coupler 160 and may output the signal to an antenna through the first output port Output 1.

A first output signal of the fourth coupler 170 may be delivered to the fourth delay 190, and a second output signal of the fourth coupler 170 may be outputted to an antenna through the fourth output port Output 4. The fourth delay 190 may delay the first output signal of the fourth coupler 170 and may output the signal to an antenna through the third output port Output 3.

The third delay 180 and the fourth delay 190 may be implemented by the 90-degree phase delay of the structure shown in FIG. 6.

Figure 8:
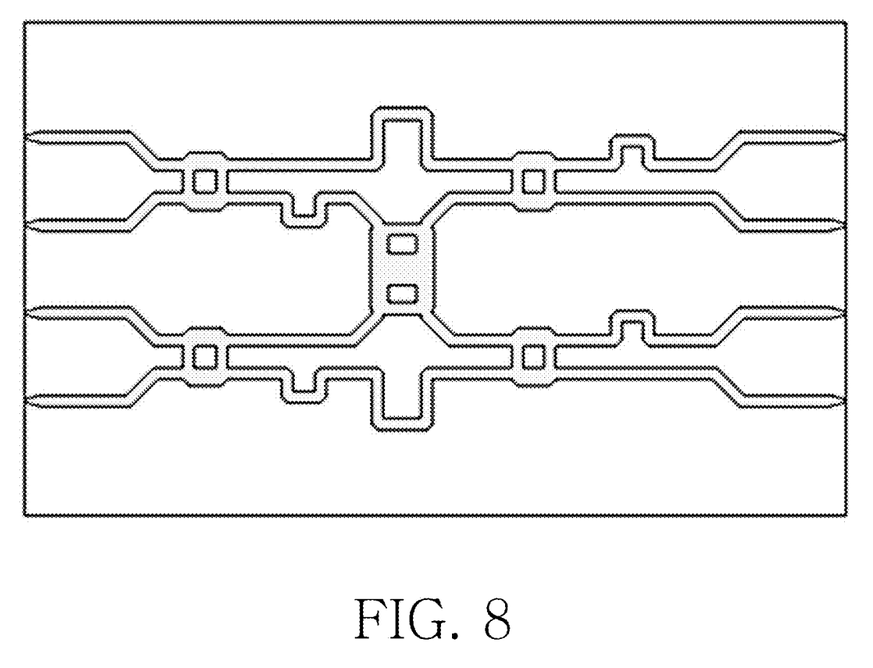
FIG. 8 is a view illustrating a design of a real structure of a feeding network device according to an embodiment of the disclosure.
Figure 9:
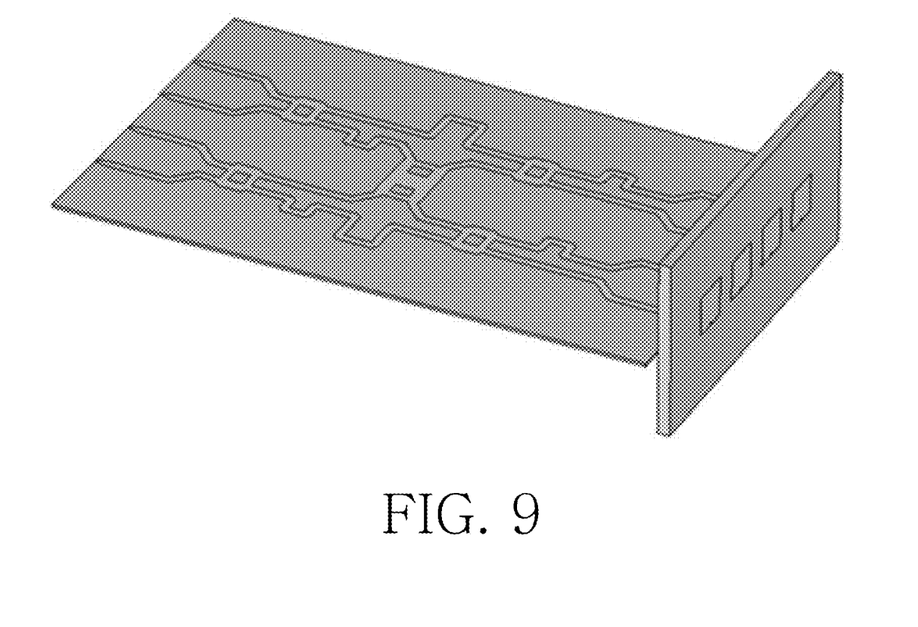
FIG. 9 is a view illustrating a structure which couples array antennas to the feeding network device shown in FIG. 8.

A design of a real structure of a feeding network device according to an embodiment of the disclosure is illustrated in FIG. 8. FIG. 9 illustrates a structure which couples array antennas to the feeding network device. As shown in FIG. 9, antennas may be connected to the output ports Output 1, 2, 3, 4 of the feeding network device, respectively.

Meanwhile, input signals may be inputted to the input ports Input 1, 2, 3, 4 one by one in sequence at time intervals. That is, the input signals may be inputted to the input ports Input 1, 2, 3, 4 in such a manner that 1) the first input signal is inputted to the first input port Input 1, 2) the second input signal is inputted to the second input port Input 2, 3) the third input signal is inputted to the third input port Input 3, 4) the fourth input signal is inputted to the fourth input port Input 4, 5) the first input signal is inputted to the first input port Input 1, . . . .

Figure 10:
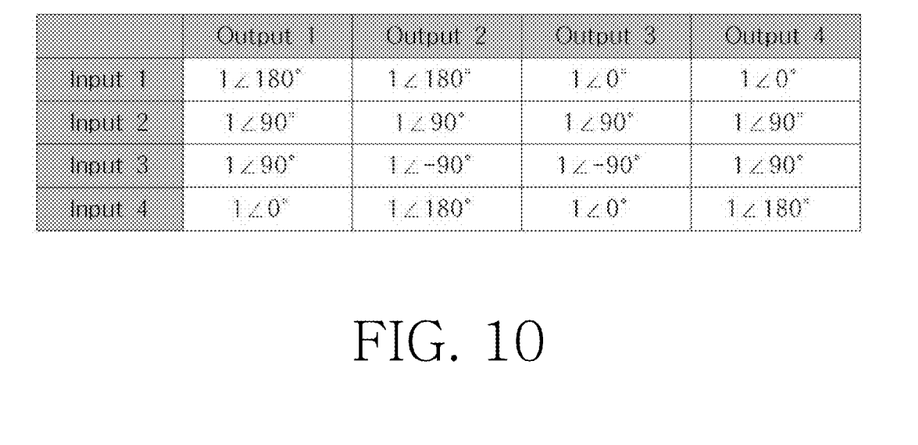
FIG. 10 is a table showing a signal relationship between an input port and an output port in a feeding network device.

FIG. 10 is a table showing a signal relationship between an input port and an output port in a feeding network device. When the first input signal is inputted to the first input port Input 1, phase variations of output signals outputted through the output ports Output 1, 2, 3, 4 from the first input signal may be $1\angle 180°$, $1\angle 180°$, $1\angle 0°$, $1\angle 0°$.

Likewise, when the second input signal is inputted to the second input port Input 2, phase variations of output signals outputted through the output ports Output 1, 2, 3, 4 from the second input signal may be $1\angle 90°$, $1\angle 90°$, $1\angle 90°$, $1\angle 90°$.

That is, when the second input signal is inputted to the second input port Input 2, output signals of the output ports Output 1, 2, 3, 4 may have the same phases of 90 degrees. On the other hand, when input signals are applied to the other input ports Input 1, 3, 4, each input signal is divided into two signals at each output port and signals of a 180-degree phase difference are outputted.

As described above, in the feeding network device according to an embodiment, one beam may be outputted from the output ports with the same phase (in-phase), and the other beams may be outputted from the output ports with offsetting phases.

Figure 11:
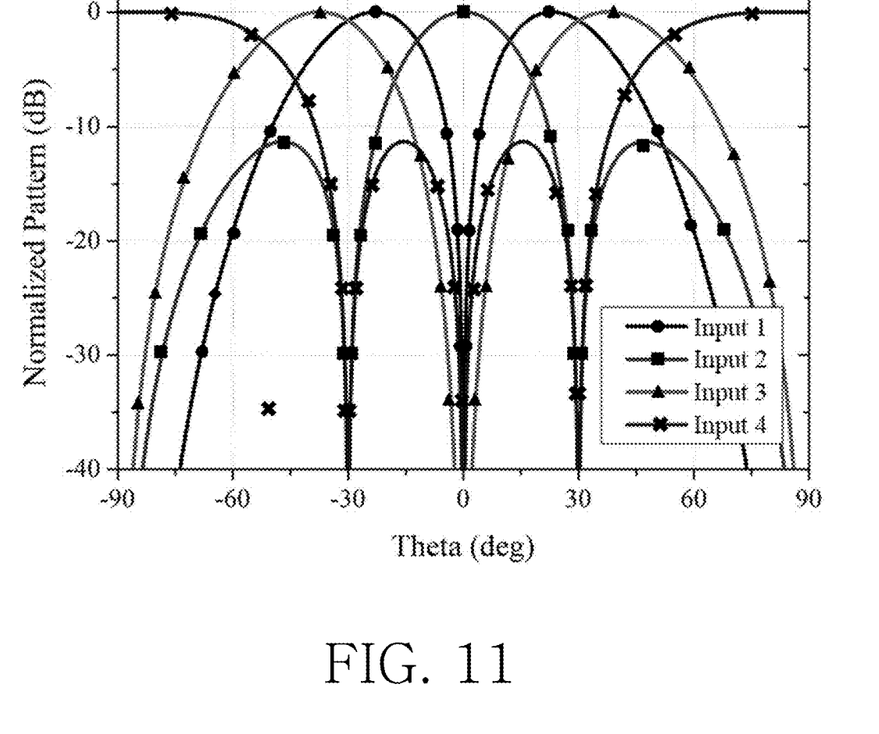
FIG. 11 is a view illustrating beam patterns emitted when output signals reflecting the table of FIG. 10 are fed to array antennas which are arranged at half-wavelength intervals.

When output signals reflecting the table of FIG. 10 are fed to array antennas which are arranged at half-wavelength intervals, beam patterns shown in FIG. 11 may be formed. When in-phase signals are outputted (when signals are inputted to the second input port), a sum beam pattern (s-Beam) which is emitted toward a center appears, and, when signals of offsetting phases are outputted (when signals are inputted to first, third or fourth input port), a difference beam pattern (A-Beam) which is not formed on a center and branches into the left and right sides appears.

A difference beam pattern emitted through the antennas when a signal is inputted through the first input port Input 1, and a different beam pattern emitted through the antennas when a signal is inputted through the third input port Input 3 may have the latest phases on the center and both ends.

However, a difference beam pattern emitted through the antennas when a signal is inputted through the fourth input port Input 4 may have the earliest phase on both ends, and may have the latest phase on the center and between both ends.

Since one sum beam pattern and three difference beam patterns appear in the feeding network device according to an embodiment, a plurality of monopulse ratios which are expressed by a ratio between a difference beam and a sum beam may be calculated. Accordingly, based on this, more improved direction estimation is possible.

Figure 12:
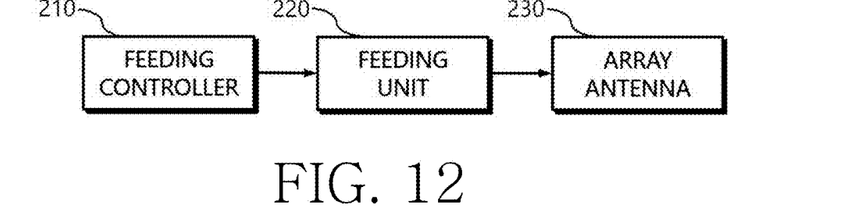
FIG. 12 is a block diagram of a radar device according to another embodiment of the disclosure.

FIG. 12 is a block diagram of a radar device according to another embodiment of the disclosure. The radar device according to an embodiment may include a feeding controller 210, a feeding unit 220, and an array antenna 230 as shown in the drawing.

The feeding unit 220 may be the array antenna feeding network device shown in FIG. 4. The feeding controller 210 may be connected to input ports of the feeding unit 220 to apply input signals to the input ports in sequence. The array antenna 230 may be antennas that are connected to output ports of the feeding unit 220.

When a signal is inputted to the second input port of the feeding unit 220 by the feeding controller 210, the feeding unit 220 may generate and emit a sum beam pattern through the array antenna 230. On the other hand, when a signal is inputted to the first input port, the third input port, or the fourth input port of the feeding unit 220 by the feeding controller 210, the feeding unit 220 may generate and emit a difference beam pattern through the array antenna 230.

Accordingly, the feeding unit 220 may generate one sum beam pattern and three difference beam patterns under control of the feeding controller 210, and may emit the beam patterns through the array antenna. 230.

Up to now, the feeding network device for improved direction estimation has been described with reference to a preferred embodiment.

An embodiment of the disclosure proposes a feeding network device of an array antenna which is applicable to a monopulse radar device and is capable of improving direction estimation technology.

Specifically, the feeding network device of the array antenna may be configured to emit one sum beam and a plurality of difference beams, so that improved direction estimation is possible through a plurality of monopulse ratios.

The apparatus according to an embodiment may be utilized in an RF/microwave circuit for wireless communication, an MMIC component and an antenna transmission/reception system, and may be applied to a next-generation beamforming system such as a 5G system and a satellite communication system.

In addition, the apparatus may be utilized in an application such as a smart home, a smart factory in a sensor network system such as a Bluetooth system, an IoT sensor system, or the like.

The technical concept of the disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A feeding network device comprising:
    a first coupler configured to convert a first input signal inputted through a first input port into two output signals having a 90-degree phase difference and to output the signals, and to convert a second input signal inputted through a second input port into two output signals having a 90-degree phase difference and to output the signals;
    a second coupler configured to convert a third input signal inputted through a third input port into two output signals having a 90-degree phase difference and to output the signals, and to convert a fourth input signal inputted through a fourth input port into two output signals having a 90-degree phase difference and to output the signals;
    a first delay configured to delay a second output signal of the first coupler;
    a second delay configured to delay a second output signal of the second coupler;
    a third coupler configured to convert a first output signal of the first coupler into two output signals having a 90-degree phase difference and to output the signals, and to convert a first output signal of the second coupler into two output signals having a 90-degree phase difference;
    a fourth coupler configured to convert an output signal of the first delay into two output signals having a 90-degree phase difference and to output the signals, and to convert an output signal of the second delay into two output signals having a 90-degree phase difference and to output the signals;
    a third delay configured to delay a first output signal of the third coupler;
    a first output port configured to output an output signal of the third delay;
    a second output port configured to output a second output signal of the third coupler;
    a fourth delay configured to delay a first output signal of the fourth coupler;
    a third output port configured to output an output signal of the fourth delay; and
    a fourth output port configured to output a second output signal of the fourth coupler.

2. The feeding network device of claim 1, further comprising a crossover configured to cross the output signal of the first delay and the first output signal of the second coupler, and to deliver the signals to the fourth coupler and the third coupler, respectively.

3. The feeding network device of claim 1, wherein the first input signal, the second input signal, the third input signal, and the fourth input signal are inputted to the first input port, the second input port, the third input port, and the fourth input port, respectively, in sequence at time intervals.

4. The feeding network device of claim 3, wherein antennas are connected to the first output port, the second output port, the third output port, and the fourth output port, respectively.

5. The feeding network device of claim 4, wherein, when the second input signal is inputted through the second input port, a sum beam pattern is emitted from the antennas.

6. The feeding network device of claim 5, wherein, when the first input signal is inputted through the first input port, the second input signal is inputted through the second input port, or the third input signal is inputted through the third input port, a difference beam is emitted from the antennas.

7. The feeding network device of claim 6, wherein a difference beam pattern emitted through the antennas when the first input signal is inputted through the first input port, and a difference beam pattern emitted through the antennas when the third input signal is inputted through the third input port have a latest phase on a center and both ends, and
   wherein a difference beam pattern emitted through the antennas when the fourth input signal is inputted through the fourth input port has an earliest phase on both ends and has a latest phase on a center and between the center and both ends.

8. A radar device comprising:
   a first coupler configured to convert a first input signal inputted through a first input port into two output signals having a 90-degree phase difference and to output the signals, and to convert a second input signal inputted through a second input port into two output signals having a 90-degree phase difference and to output the signals;
   a second coupler configured to convert a third input signal inputted through a third input port into two output signals having a 90-degree phase difference and to output the signals, and to convert a fourth input signal inputted through a fourth input port into two output signals having a 90-degree phase difference and to output the signals;
   a first delay configured to delay a second output signal of the first coupler;
   a second delay configured to delay a second output signal of the second coupler;
   a third coupler configured to convert a first output signal of the first coupler into two output signals having a 90-degree phase difference and to output the signals, and to convert a first output signal of the second coupler into two output signals having a 90-degree phase difference;
   a fourth coupler configured to convert an output signal of the first delay into two output signals having a 90-degree phase difference and to output the signals, and to convert an output signal of the second delay into two output signals having a 90-degree phase difference and to output the signals;
   a third delay configured to delay a first output signal of the third coupler;
   a first output port configured to output an output signal of the third delay;
   a second output port configured to output a second output signal of the third coupler;
   a fourth delay configured to delay a first output signal of the fourth coupler;
   a third output port configured to output an output signal of the fourth delay;
   a fourth output port configured to output a second output signal of the fourth coupler; and
   an array antenna which comprises antennas connected to the first output port, the second output port, the third output port, and the fourth output port, respectively.

\* \* \* \* \*